United States Patent [19]

Sharma

[11] Patent Number: 5,314,853
[45] Date of Patent: May 24, 1994

[54] HIGH TEMPERATURE SORBENTS FOR OXYGEN

[75] Inventor: Pramod K. Sharma, La Canada, Calif.

[73] Assignee: The United States of America as represented by the Administrator of the National Aeronautics and Space Administration, Washington, D.C.

[21] Appl. No.: 991,003

[22] Filed: Dec. 16, 1992

[51] Int. Cl.⁵ .................. B01J 29/06; B01J 37/30
[52] U.S. Cl. ............................... 502/66; 502/74
[58] Field of Search .................... 502/66, 74

[56] References Cited

U.S. PATENT DOCUMENTS

| | | | |
|---|---|---|---|
| 3,259,564 | 7/1966 | Kimberlin, Jr. | 502/66 |
| 3,328,291 | 6/1967 | Mulaskey | 502/74 |
| 3,437,586 | 4/1969 | Weiz | 502/74 |
| 3,549,518 | 12/1970 | Mason et al. | 502/74 |
| 4,079,092 | 3/1978 | Hayes et al. | 260/667 |
| 4,425,143 | 1/1984 | Nishizawa et al. | 55/31 |
| 4,491,637 | 1/1985 | Hartig et al. | 502/66 |
| 4,622,308 | 11/1986 | Koikeda et al. | 502/66 |
| 4,698,322 | 10/1987 | Santilli et al. | 502/74 |
| 4,699,894 | 10/1987 | Santilli et al. | 502/74 |
| 4,734,273 | 3/1988 | Haskell | 423/219 |
| 4,800,189 | 1/1989 | Eschwey et al. | 502/400 |
| 5,006,496 | 4/1991 | Huizinga et al. | 521/61 |

*Primary Examiner*—Carl F. Dees
*Attorney, Agent, or Firm*—Thomas H. Jones; John H. Kusmiss; Guy M. Miller

[57] ABSTRACT

A sorbent capable of removing trace amounts of oxygen (ppt) from a gas stream at a high temperature above 200° C. comprising a porous alumina silicate support such as zeolite containing from 1 to 10 percent by weight of ion exchanged transition metal such as copper or cobalt ions and 0.05 to 1.0 percent by weight of an activator selected from a platinum group metal such as platinum. The activation temperature, oxygen sorption and reducibility are all improved by the presence of the platinum activator.

9 Claims, 2 Drawing Sheets

HIGH TEMPERATURE SORBENTS FOR OXYGEN

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The present invention relates to oxygen sorbents and more particularly, this invention relates to solid oxygen sorbents capable of lowering equilibrium oxygen levels to below 1 part-pertrillion at high temperatures of at least 400° C.

BACKGROUND OF THE INVENTION

There are many efficient sorbents for oxygen at moderate temperatures. Commercial oxygen sorbent (BASF catalyst R-3-11) which is believed to comprise 5-6 metals deposited on a silica support has an upper temperature limit of 250° C. and is degraded by accidental exposure to atmospheric air at room temperature. In Principle, transition metals such as copper and cobalt are capable of reducing trace oxygen contamination in inert gases to sub parts-per-billion (ppb) levels over a wide temperature range (100°-800° C.). The favorable thermodynamics for these two metals is readily apparent from a consideration of equilibrium partial pressures of oxygen over copper or cobalt as shown in the following table.

TABLE I:

EQUILIBRIUM OXYGEN PARTIAL PRESSURES RESULTING FROM FORMATION OF COPPER AND COBALT OXIDES

| Temperature (K) | $P_{O_2}$ based on CuO (atm) | $P_{O_2}$ based on $Cu_2O$ (atm) | $P_{O_2}$ based on CoO (atm) |
|---|---|---|---|
| 400 | $1.0 \times 10^{-31}$ | | |
| 600 | $3.0 \times 10^{-18}$ | $1.8 \times 10^{-22}$ | |
| 700 | $2.0 \times 10^{-14}$ | $2.9 \times 10^{-18}$ | |
| 800 | $1.4 \times 10^{-11}$ | $4.1 \times 10^{-15}$ | $5.40 \times 10^{-24}$ |
| 900 | $2.1 \times 10^{-9}$ | $1.1 \times 10^{-12}$ | $1.37 \times 10^{-20}$ |
| 1000 | | $9.4 \times 10^{-11}$ | $7.19 \times 10^{-18}$ |
| 1100 | | | $1.19 \times 10^{-15}$ |
| 1200 | | | $8.47 \times 10^{-14}$ |
| 1300 | | | $3.13 \times 10^{-12}$ |

These values were obtained from the literature values of free energies of species involved in the overall oxidation reaction and the relationship $$\Delta G° = -RT \ln K_p$$

where $\Delta G°$ is the free energy change for the reaction and $K_p$ is the equilibrium constant.

Even though the equilibrium oxygen levels are very low at high temperature (400° C.) the oxidation kinetics are very slow. Oxidation kinetics of transition metals such as copper can be catalyzed by supporting the metals on zeolites. Apparently, the oxidation is catalyzed by acid sites on the zeolite and leads to high rates of copper-utilization (above 75%) at the upper end of the temperature range (500° C.). Cobalt has significantly better oxygen equilibrium removal values. These supported catalysts are stable at room temperature requiring heating to an elevated activation temperature above 150° C.

Furthermore, there are several processes for forming special materials that require oxygen removal to parts per trillion level at temperatures up to 1000° C. For example, processing of some materials and alloys in micro-gravity conditions and of certain semiconductors require high temperature and trace oxygen removal. Cobalt exchanged zeolites are capable of efficient oxygen absorption at temperatures up to the structural stability limit of the zeolite support.

Preparation of transition metal exchanged zeolites is relatively straightforward. However, reduction of such materials is not always practical. The zeolites are only stable up to temperatures of from 600° to 800° C. After extensive treatment of the cobalt containing zeolite sorbents with hydrogen at temperatures from 200° to 650° C. for periods up to 24 hours, there was little change of color of the samples, indicating a substantial lack of reduction.

After exposure of cobalt exchanged zeolite L and 13X sorbents with 4% hydrogen—argon gas mixture at 600° C. for 16 hours followed by contact with oxygen at 600° C. only a small amount of oxygen uptake occurred consistent with lack of reduction. While 600° C. is somewhat outside the stability limit of zeolite 13X, zeolite L is stable at temperatures up to about 800° C. An attempt to reduce cobalt exchanged zeolite L even at 800° C. with hydrogen was not successful.

STATEMENT OF THE INVENTION

A regenerable oxygen sorbent capable of efficiently removing oxygen to parts-per-trillion (ppt) level at a temperature above 200° C. is provided in accordance with the invention. The reduction of the sorbent is nearly complete and the utilization of the transition metal during the oxygen uptake step is high. It has been found that not only is reduction facilitated, but total oxygen absorbed is much higher with the sorbent of the invention than with transition metal exchanged zeolite sorbents.

The transition metal exchanged zeolite sorbents are modified in accordance with the invention to include a small amount, unusually 0.1 to 10 percent by weight, preferably 0.1 to 1.0 percent of an activator platinum group metal such as platinum or palladium. Though these metals lower the reduction temperature of copper or cobalt supported on zeolite, they are unexpectedly found to significantly coact with the zeolite support and the transition metal to greatly increase the total amount of absorbed oxygen.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
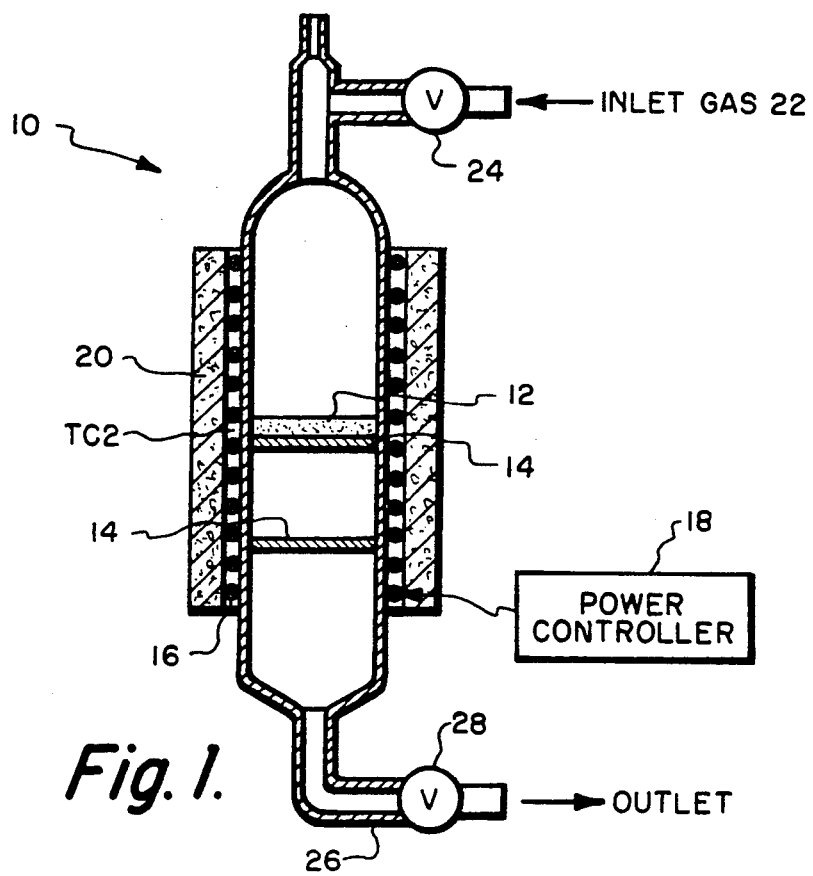
FIG. 1 is a schematic view of an absorber for absorbing oxygen.

The sorbent comprises a porous high surface area zeolite that is stable at a temperature above 400° C., preferably up to about 1000° C. The surface area is at least 100 m$^2$/g, usually around 200-600 m$^2$/g. Zeolite 13X which has a lattice spacing of 10 Angstroms and Zeolite L which has a lattice spacing of 3.3 Angstroms are suitable for practice of the invention. Zeolite 13X is stable at temperatures up to about 600° C. and Zeolite L is stable at temperatures up to about 800° C. The large pore openings also facilitate the in-situ deposition of the activator within the cages of the porous zeolite and the exchange of the transition metal.

The activity of the sorbents of the invention may also be attributable to the method of preparation. The sorbent is formed by first incorporating the transition metal ion into the zeolite by ion exchange followed by addition of the activator to the transition metal exchanged zeolite by incipient impregnation.

A zeolite is converted from sodium to ammonium form by treatment with a 0.1 to 2.0 molar solution of an ammonium salt of a strong acid, typically 1M ammonium nitrate. The ammonium exchanged zeolite is then contacted with a dilute aqueous solution of transition metal salt such as 0.05M to 1.0M copper nitrate or cobalt nitrate. The transition metal ion exchanged zeolite is well rinsed in distilled water and dried. The resulting material contains from 1 to 12 percent by weight of transition metal ion, usually about 5 to 7 percent metal.

Platinum is introduced into the porous zeolite by impregnation of an aqueous solution of a thermally decomposable salt of a platinum group metal, such as platinum or palladium, into the pores of the zeolite followed by evaporation of the water and decomposition of the salt to deposit platinum within the pores. For example, chloroplatinic acid is dissolved in distilled water. The solution is imbibed into the zeolite until all the solution is absorbed into the zeolite pores and no solution is visible outside the pores. The zeolite is dried again in an air oven at a temperature above 150° C., usually 250° C. to drive off the water and decompose the salt. About 0.05 to 1 percent platinum or palladium is introduced into the zeolite.

The catalytic properties of the zeolite and the activation temperatures are related to acidic sites and aluminum content. Activation temperature is lowered as the Si/Al atomic ratio is less than about 2.6, preferably about 0.8 to 2.0. However, zeolites such as Zeolite 13X with higher alumina content have lower temperature stability than zeolites such as Zeolite L which has a lower aluminum content.

The zeolites can be provided in several different physical forms. The porous zeolite sorbents can be in the form of beads, cylindrical rods, spherical pellets, or as a wash coat on a monolithic ceramic support. Oxygen is removed from a gas stream by flowing the gas through a stationary bed of the sorbent. The sorbent bed is heated to activation temperature during an absorption cycle and during a reduction cycle. Two sorbent beds may be provided in parallel, one being used for absorption and the other for reduction-regeneration of the bed. Reduction of the cobalt-based sorbent is carried out in a temperature of from 400° C. to 800° C., usually 600° C. in the presence of a hydrogen containing gas. The reduction of the copper-based sorbent can be corrected out in a temperature of from 200° C. to 220° C.

A single reactor 10 capable of both absorption and regeneration is illustrated in FIG. 1. A bed 12 of zeolite is immobilized in reactor 10 on a gas permeable support 14 such as a fritted quartz disc.

The reactor 10 is heated by an external resistance heater 16 connected to a power controller 18. The resistance heater is covered by a layer 20 of insulation. The inlet 22 is connected to a selector valve 24 which can be turned to a source of oxygen containing gas, a source of reducing gas or a source of purge gas or to an isolation position to isolate the regenerated sorbent bed 12 from ambient air. The outlet 26 contains a second isolation valve 28.

The invention will now be illustrated by the preparation of copper and cobalt exchange Zeolite 13X and L sorbents with and without platinum activator.

Zeolites 13X and L were first treated with 1 molar solution of ammonium nitrate to replace sodium in the zeolite by ammonium. The ammonium exchanged zeolites were then treated with 0.1 molar solution of cobalt nitrate or a 0.2 molar solution of copper nitrate to replace the ammonium with cobalt or copper ions. The cobalt or copper exchanged zeolites, thus prepared, were well rinsed in distilled water and dried in an air oven at 250° C. The sorbents with copper exchange and cobalt exchange were denoted CU13X, CUEXL, 3COEX13X and COEXL. The addition of platinum to the treated zeolite obtained at the end of above step was then carried out. A platinum solution was prepared by dissolving chloroplatinic acid, H$_2$PtCl$_6$, in distilled water. The addition of the solution was carried out in such a way so that all the solution was absorbed into the zeolite pores and no liquid solution was visible outside the pores. Further, the amount of platinum introduced this way was approximately 0.1% by weight of the zeolite. Finally, the treated zeolite was dried again in the air oven at 250° C.

The catalytic sorbent preparations used in this study containing platinum were denoted COPT13X, COPTL, and, CUPT13X which consisted of cobalt or copper and platinum supported on zeolites 13X and L, respectively. For comparison, tests were conducted with copper and cobalt exchanged zeolite sorbents with no platinum addition, 3COEX13X, CU13X and COEXL. The weight percentages of the metallic constituents on various zeolites are shown in Table II.

TABLE II

| Sorbent | Co (wt %) | Cu (wt %) | Pt (wt %) |
|---|---|---|---|
| COPT13X | 5.2 | — | 0.1 |
| COPTL | 3.7 | — | 0.1 |
| 3COEX13X | 5.5 | — | — |
| COEXL | 3.5 | — | — |
| Cu13X | —6.0 | — | |
| CuPT13X | — | 6.0 | 0.1 |

Reduction of the sorbent was carried out by heating the sorbent in a mixture of nitrogen and hydrogen at a temperature of 200° to 600° C. The reactor system used for reduction is shown in FIG. 1. The hydrogen concentration in the reducing gas mixture was gradually increased from 1% H$_2$ to 20% H$_2$ over a 24 hour period. At the end of this period, the sorbent was visually inspected. The sorbent beads were found to be fully black in color indicating to a good measure that reduction had taken place.

When cobalt exchanged samples of Zeolites 13X and L (with no platinum addition) were treated to a reducing gas under conditions identical to those described above, no appreciable change in color of the zeolite beads occurred, indicating a general lack of reduction.

Oxygen uptake of the reduced sorbent was investigated by a measurement of the temperature rise upon exposing the reduced sorbent to a gas mixture of oxygen and nitrogen.

Before exposure to oxygen, the reduced sorbent was contained in a quartz reactor tube and a thermocouple was placed in the center of the sorbent bed. The sorbent bed was heated to about 625° C. and high purity nitrogen flowed through the sorbent at a rate of 100 cc/min. When steady state condition were achieved, oxygen at a rate of 10 cc/min was introduced into the nitrogen flow so that a gas mixture consisting of 10% $O_2$—90% $N_2$ flowed through the sorbent bed. The bed temperature recorded by the thermocouple was monitored as a function of time.

The temperature at the bottom of the sorbent bed, resulting from oxygen sorption on the reduced sorbent, is plotted as a function of time elapsed after introducing oxygen into the inert gas flowing through the bed. The bed/gas temperature profiles show a rapid rise leading to a maximum followed by a more gradual return to the initial value. The initial rate of rise of the bed temperature can be correlated to the initial chemisorption rate while the total area under the time-temperature curve can be correlated to the extent of reaction or to the total oxygen uptake.

Figure 2:
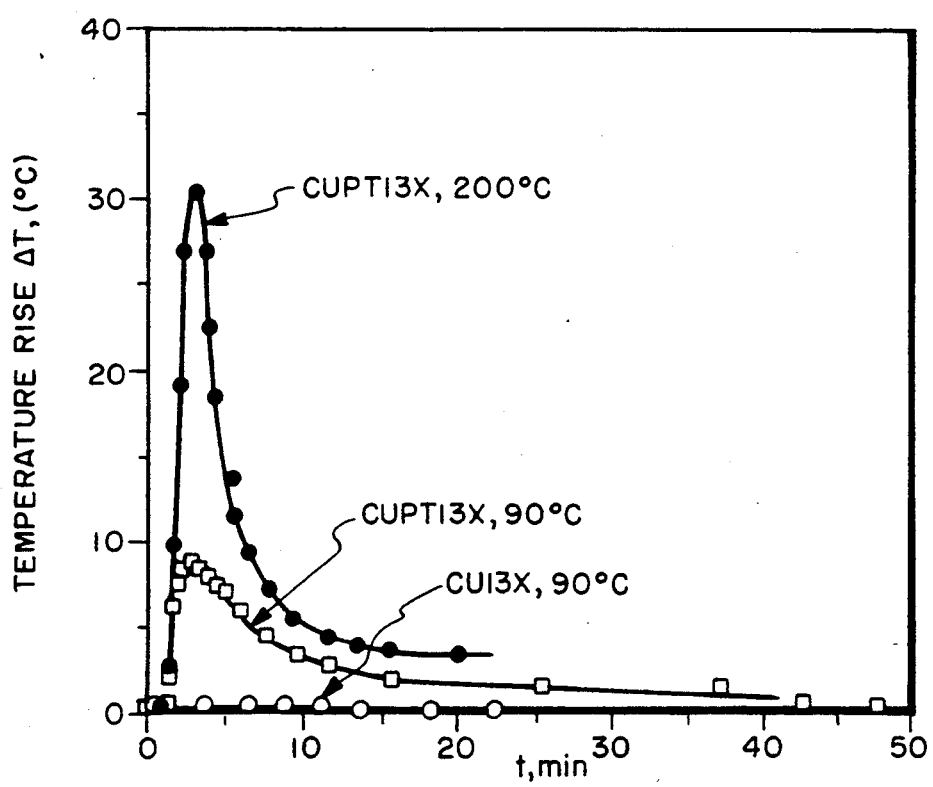
FIG. 2 is a set of curves showing a comparison of oxygen uptake of copper exchanged zeolite sorbent with platinum containing copper exchanged zeolite sorbent.

The temperature time rise of the copper exchange zeolite 13X illustrated in FIG. 2 shows no temperature rise at 90° C. However, the bed of the CUPT13X sorbent containing 0.1% platinum shows a 10 degree rise in temperature at 90° C. and a 30 degree rise in temperature at 200° C. The presence of platinum, while facilitating reduction of the sorbent, also lowers activation temperature and increases the total uptake of oxygen.

Figure 3:
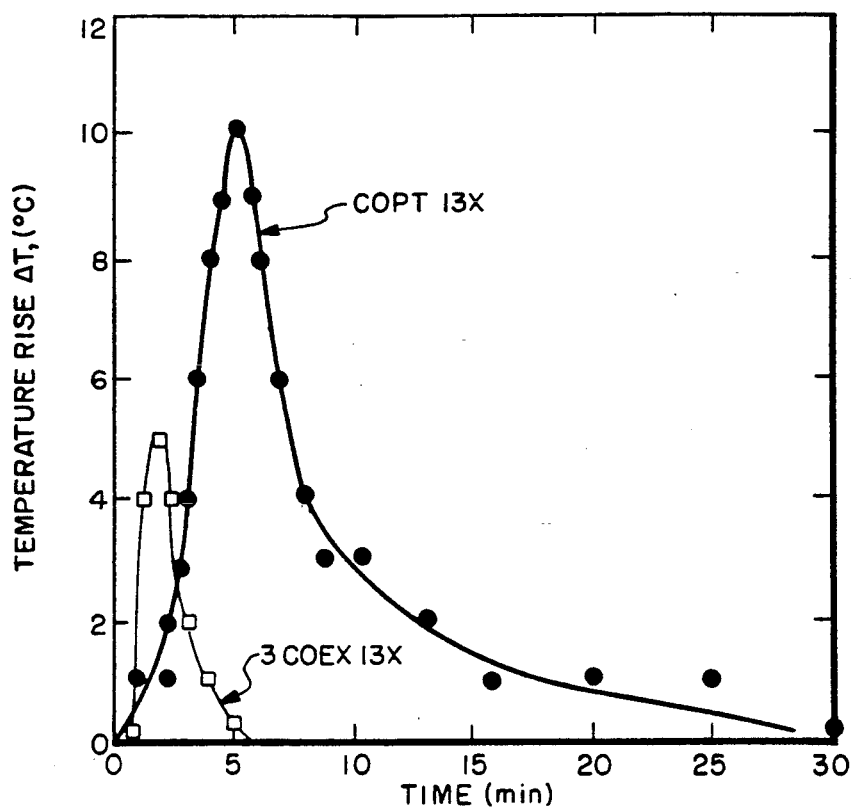
FIG. 3 is a set of curves showing oxygen absorption by a platinum free and a platinum containing cobalt exchanged Zeolite 13X, sorbent.
Figure 4:
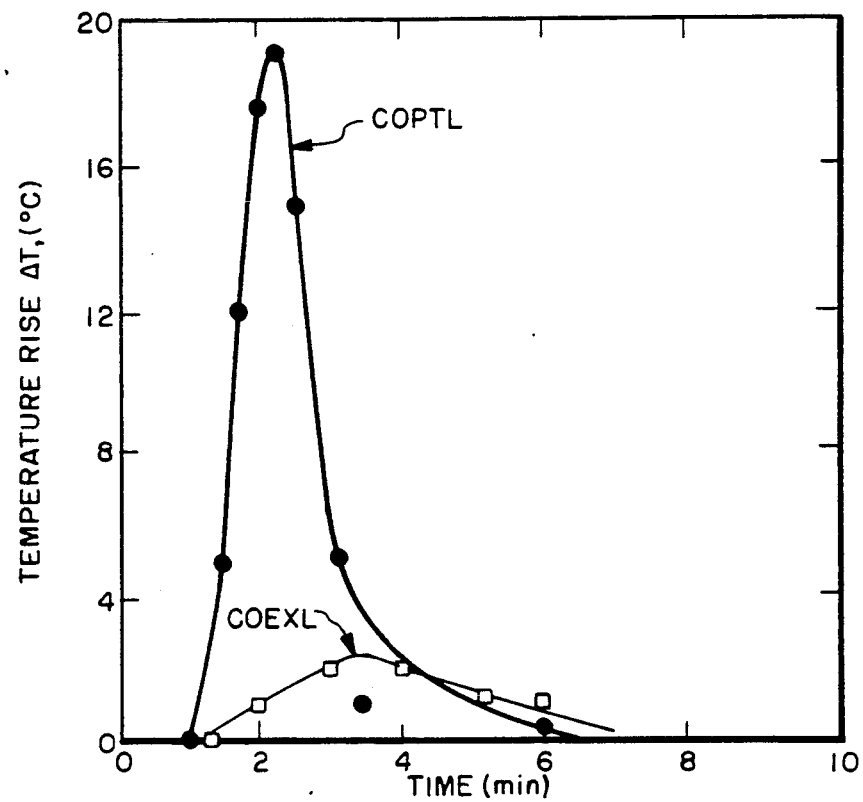
FIG. 4 is a set of curves showing oxygen absorption Z by a platinum free and a platinum containing cobalt exchanged Zeolite L sorbent.

The temperature-time profiles obtained for sorbent COPT13X and the platinum free cobalt-exchanged Zeolite 13X (3COEX13X) are shown in FIG. 3. Similar profiles for sorbent COPTL and cobalt-exchanged zeolite L (COEXL) are shown in FIG. 4. The data in both FIGS. 3 and 4 clearly show a significant increase in bed temperature rise with the platinum-containing material as compared to the plain cobalt exchanged zeolites. The oxygen absorption with platinum-cobalt sorbent is much higher than with plain cobalt and the resulting bed temperature rise can be higher. After 3 cycles of regeneration of the COPTL sorbent at 650° C. there was no loss in oxygen absorption.

The bed temperature rise upon contact with oxygen is a measure of reactivity to oxygen. The area under the temperature rise-time plot is proportional to the total oxygen uptake. As seen from FIGS. 3 and 4, platinum containing cobalt-based sorbents upon being subjected to the reducing gas are a lot more reactive to oxygen than corresponding materials with no platinum addition. The oxygen uptake of the platinum containing sorbents is significantly greater than the plain cobalt exchanged materials.

Above results lead to the conclusion that addition of a small quantity of platinum to copper or cobalt exchanged zeolites 13X and L greatly enhances the reduction of copper or cobalt and hence leads to high temperature oxygen sorbents of significantly increased capacity.

It is to be realized that only preferred embodiments of the invention have been described and that numerous substitutions, modifications and alterations are permissible without departing from the spirit and scope of the invention as defined in the following claims.

I claim:

1. A regenerable sorbent for the removal of trace amounts of oxygen from a gas comprising;
   a porous alumino-silicate zeolite support in which the atomic ratio of Si to Al is no more than 2.6/1;
   from 1 to 10% by weight of a transition metal ion selected from cobalt or copper exchanged with the support; and
   0.05 to 1.0% by weight of a platinum group metal deposited on the support as an activator.

2. A sorbent according to claim 1 in which the metal ion is cobalt.

3. A sorbent according to claim 2 in which the activator is platinum.

4. A sorbent according to claim 1 in which the zeolite has a Si/Al ratio from 0.8 to 2.6.

5. A sorbent according to claim 4 in which the pore surface area of the support is from 200 to 600 $m^2/g$.

6. A sorbent according to claim 5 in which the zeolite has a lattice opening from 2 Angstroms to 12 Angstroms.

7. A method of preparing an oxygen sorbent comprising the steps of:
   exchanging an ion in a porous, alumino-silicate zeolite lattice in which the atomic ratio of Si to Al is no more than 2.6/1 with a transition metal ion selected from copper or cobalt and,
   precipitating an activator selected from a platinum group metal within the pores of the zeolite by incipient impregnation technique.

8. A method according to claim 7 in which the transition metal ion is present in an amount from 1 to 10 percent by weight.

9. A method according to claim 8 in which the activator is platinum and is present in an amount from 0.05 to 1.0 weight percent.

* * * * *